June 23, 1959 G. H. YELINEK 2,891,674
OIL FILTER CARTRIDGE
Filed April 23, 1956
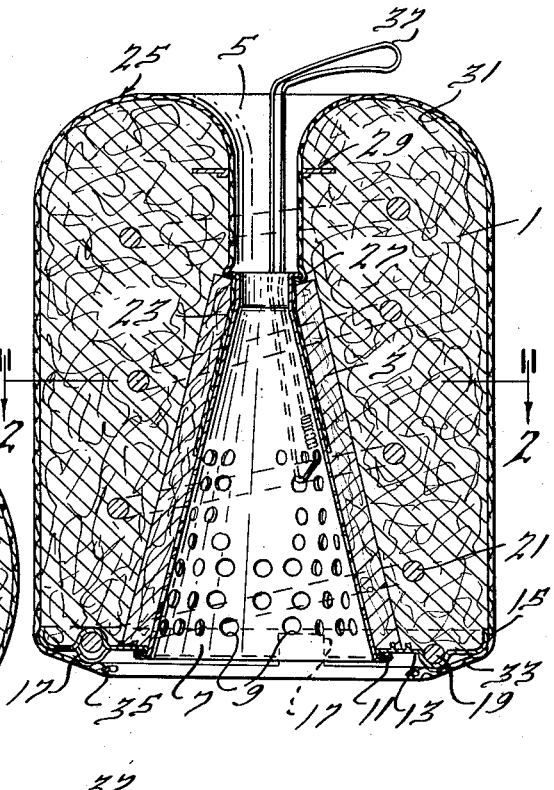
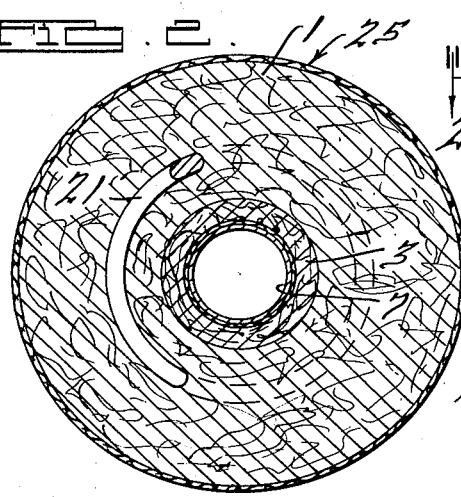
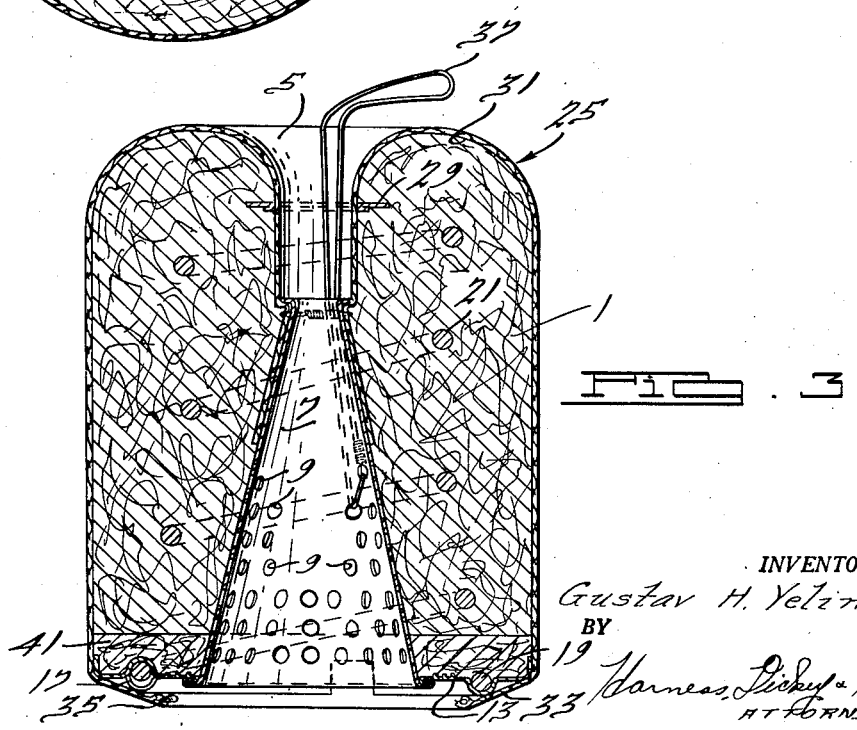
INVENTOR.
Gustav H. Yelinek
BY
Harness, Dickey & Pierce
ATTORNEYS.

United States Patent Office 2,891,674
Patented June 23, 1959

2,891,674

OIL FILTER CARTRIDGE

Gustav H. Yelinek, Racine, Wis., assignor to DeLuxe Products Corporation, La Porte, Ind., a corporation of Indiana Application April 23, 1956, Serial No. 579,963

3 Claims. (Cl. 210—457)

This invention relates to filters and in particular to replaceable filter cartridges. While not so limited, the invention has a major application in the field of oil filtering for internal combustion engines, particularly heavy duty engines used in farm equipment and trucks or buses.

It is the object of this invention to provide an improved type of filter cartridge embodying two stage filtration.

Another object of the invention is to increase the efficiency of a known type of filter cartridge.

Another object of the invention is to provide a more uniform flow of liquid through a filter cartridge.

An additional object is to provide a filter cartridge having a full flow and high rate of flow portion and a partial and lower rate of flow portion.

The invention in its preferred embodiments contemplates improvements in the type of filter cartridges shown in Hurn U.S. Patents 2,168,124 and 2,175,775. These patents show a filter construction and a method of making it wherein the filter mass comprises a band of long cotton threads wrapped under tension about a core having a conical bottom inlet portion and held against collapse by a helical coil spring embedded in the filter mass. While this type of filter cartridge does an excellent job of filtering oil in the lubrication systems of internal combustion engines, I have discovered that a surprising improvement in efficiency and increase in life of the cartridge can be obtained by means of my invention. In accordance with my invention I place a mass of sisal fibers, or the equivalent, at a point in the filter cartridge where the oil enters so that impure oil or liquid must pass through the sisal before it penetrates any substantial distance into the cotton filter mass. Since the mass of sisal has less resistance to oil flow than the compact and denser cotton mass, the oil tends to flow at a somewhat higher rate through it and the larger particles, which have not been separated by the cone, are removed. The sisal mass tends to spread the entering oil over a larger area prior to its entry into the cotton mass and thus provides for a more widely distributed and more uniform flow of the oil through the cotton mass, the latter being capable of removing the very small and even colloidial particles of impurities, including asphaltenes.

The invention is illustrated in the accompanying drawings in which:

Figure 1 is a cross section through a filter cartridge of the type fully described in the aforementioned patents and embodying one form of my invention;

Fig. 2 is a cross section taken along the line 2—2 of Fig. 1; and

Fig. 3 is a longitudinal cross section through a cartridge embodying a modification of my invention.

As already indicated, the filter cartridge shown in Figs. 1 and 2 is completely described, with the exception of my invention, in the aforementioned Hurn patents. It comprises a main filter mass 1 and, in accordance with the present invention, an auxiliary filter mass 3. The filter masses 1 and 3 are disposed in an annular manner about a central opening 5, a bottom portion of which is provided by a metal cone 7 having orifices or openings 9 in the wall thereof extending from the base of the cone to a height somewhere around the middle of the cone, the top portion of the cone 7 being imperforate. The cone 7 has a bottom flange which is interlocked at 11 with the inner edge of annular base plate 13 provided on its outer edge with an upstanding flange 15. At an intermediate diameter the base plate 13 is slit and formed to provide alternating upper and lower groove portions 17 through which extends the bottom coil 19 of the helical coil spring 21, the portions 17 serving to securely anchor the spring to the base plate 13. Fitting along the top imperforate portion of the cone 7 on the outside thereof is the inner end 23 of the fabric sock or covering 25 which extends upwardly around the top flange 27 of the cone and within a washer 29 and then is turned over backwardly at 31 upon itself to lead down around the outside of the filter mass 1 and around the bottom of the base plate 13 as seen at 33 where the end is drawn together beneath the base plate by drawstring 35. It can be seen that the upper portion of the sock 25 will provide the top part of the aperture 5 and that the outer turned-over portion of the sock will hold the cotton threads 1 in place. As explained in the aforementioned Hurn patents, the cotton threads 1 are wound under tension about the cone 7 and spring 21 until the proper diameter is reached whereupon the sock 25 is turned back upon itself over the outer periphery of the mass 1 and tied together at the bottom by the drawstring 35. A wire bale 37 may be formed as a loop with its end running through openings 9 in the cone as clearly seen in the drawings.

In accordance with my invention, I place a cone of sisal or equivalent fiber around the outside of the cone 7. I preferably have the sisal pad or cone 3 extend for the full length of the cone 7 but it would be possible to reduce its height so that it covers only that part of the cone 7 containing the apertures 9.

In Fig. 3 the construction of the filter is essentially the same as that just described but in this case instead of the sisal cone 3 I use a sisal ring 41 located on top of the base plate 13 around the bottom of the cone 7.

As is taught in the aforementioned patent and is well known to those familiar with commercial oil filter cartridges, incoming fluid to be filtered or impure oil is discharged from a standpipe or other suitable means at an intermediate point in the imperforate portion at the top of the cone 7 and preferably is discharged in a radial direction so that it strikes the imperforate wall of the cone. This oil will flow outwardly and downwardly along the inside wall of the cone 7 and heavy particles of sludge or other impurities will drop down straight vertically into the sump (not shown) which is located below the cone. The remaining impure oil will enter the filter mass through the openings 9 and flow downwardly to the bottom of the cartridge that is to the top of the base plate 13, whereupon it reverses direction and flows upwardly through the full height of the mass 1 and is let out of the filter by suitable collecting chambers or passages near the top of the filter cartridge.

In Fig. 1 the oil which enters through the openings 9 will pass downwardly along the length of the sisal pad 3 which furnishes less resistance to flow of the oil than does the long thread cotton filter 1 so that all of the oil will flow through it. Solid impurities will be caught up in the sisal fibers and separated from the oil during its passage through the pad 3. The pad 3 provides a greater cross sectional area for oil flow than was true in the cartridge construction without the pad wherein the oil would tend to collect along the outside metal wall of the cone 7 and follow it downwardly. In the present case the oil will tend to flow through the entire cross section of the filter pad 3 and this will occur at a somewhat higher rate than it can flow through the mass 1. Since the sisal pad 3 will eliminate the larger particles and spread out the flow of inlet oil, the oil entering the filter mass 1 will be somewhat cleaner than heretofore, thus making the dense cotton filter mass 1 more efficient and providing a somewhat better distribution throughout the cross section of the mass 1.

In the filter of Fig. 3 all of the oil will flow through the sisal pad 41 after it has moved down the outside wall of the cone 7 and, as in the case of the cartridge of Fig. 1, heavier impurities will be removed as the oil passes through the sisal. The oil will tend to distribute itself uniformly through the pad 41 and pressure will cause it to rise upwardly through mass 1 toward the top of the filter. Since the pad 41 covers the entire bottom section the oil flow will be quite uniform and tendencies to channel will be minimized.

It will be appreciated that the filter cartridges of Figs. 1 and 3 act in two stages. The first stage is a full flow stage as oil goes through the sisal pad and the second stage is a partial flow at a somewhat lower rate as the oil goes through the cotton mass 1.

I claim:

1. A filter cartridge comprising a metal cone provided with apertures in a lower portion, a filter mass of long thread cotton wrapped around said cone and reinforced against collapse by a helical spring embedded therein, and a sisal mass of less resistance to flow than said cotton surrounding a portion of said cone and in contact therewith and receiving oil flowing through said apertures.

2. The invention set forth in claim 1 wherein said sisal mass comprises a conical layer wrapped around the outer surface of the cone and coaxial therewith and covering the openings in the wall of the cone.

3. The invention set forth in claim 1 wherein said sisal mass comprises a ring coaxial with said cone and having its inner diameter in engagement with a bottom portion of the cone.

References Cited in the file of this patent

UNITED STATES PATENTS

| | | |
|---|---|---|
| 931,014 | McGerry | Aug. 10, 1909 |
| 2,093,877 | Von Pentz | Sept. 21, 1937 |
| 2,168,124 | Hurn | Aug. 1, 1939 |
| 2,175,775 | Hurn | Oct. 10, 1939 |
| 2,375,345 | Burhans | May 8, 1945 |
| 2,550,853 | Nugent | May 1, 1951 |